(12) United States Patent
Dailey (10) Patent No.: US 6,564,049 B1
(45) Date of Patent: May 13, 2003

(54) METHODS AND SYSTEMS FOR PROVIDING GROUP CALLS WITH REDUCED SETUP TIMES

(75) Inventor: Timothy E. Dailey, Forest, VA (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/309,005

(22) Filed: May 10, 1999

(51) Int. Cl.[7] .......................... H04M 3/00; H04B 7/00
(52) U.S. Cl. ........................... 455/416; 455/519
(58) Field of Search .............................. 455/517, 518, 455/519, 520, 509, 414, 416, 426, 450, 451, 452, 459; 370/259, 260, 261, 338, 401

(56) References Cited

U.S. PATENT DOCUMENTS

| | | |
|---|---|---|
| 5,150,361 A | 9/1992 | Wieczorek et al. ........ 370/95.1 |
| 5,168,575 A | 12/1992 | Cizek et al. |
| 5,274,837 A | 12/1993 | Childress et al. .............. 455/7 |
| 5,299,199 A | 3/1994 | Wilson et al. .............. 370/95.3 |
| 5,345,474 A | 9/1994 | Hoshikawa ..................... 375/7 |
| 5,465,391 A | 11/1995 | Toyryla |
| 5,475,689 A | 12/1995 | Kay et al. |
| 5,506,837 A | 4/1996 | Sollner et al. ................. 370/31 |
| 5,594,948 A | 1/1997 | Talarmo et al. |
| 5,613,201 A | 3/1997 | Alford et al. |
| 5,617,412 A | 4/1997 | Delprat et al. .............. 370/281 |
| 5,629,940 A | 5/1997 | Gaskill ........................ 370/311 |
| 5,697,058 A | * 12/1997 | Paavonen ................... 370/340 |
| 5,774,806 A | 6/1998 | Tayloe et al. |
| 5,797,100 A | * 8/1998 | Dettner ....................... 455/416 |
| 5,822,694 A | 10/1998 | Coombes et al. ........... 455/433 |
| 5,850,611 A | * 12/1998 | Krebs .......................... 455/518 |
| 5,857,144 A | 1/1999 | Mangum et al. ........... 455/11.1 |
| 5,873,023 A | * 2/1999 | Phillips et al. ............. 340/7.28 |
| 5,930,723 A | * 7/1999 | Heiskari et al. ............ 455/518 |
| 5,970,417 A | * 10/1999 | Toyryla et al. ............. 455/519 |
| 5,983,099 A | * 11/1999 | Yao et al. .................... 455/426 |

(List continued on next page.)

FOREIGN PATENT DOCUMENTS

| | | | |
|---|---|---|---|
| EP | 0 642 287 A1 | 9/1993 | ............ H04Q/7/38 |
| EP | 0 942 616 | 9/1999 | ............ H04Q/7/38 |
| GB | 2 271 690 | 4/1994 | ............ H04Q/7/04 |
| WO | WO 94/14289 | 6/1994 | ............ H04Q/7/04 |
| WO | WO 94/28687 | 12/1994 | ............ H04Q/7/04 |
| WO | WO 97/07604 | 2/1997 | ............ H04B/7/26 |
| WO | WO 98/05157 A3 | 2/1998 | ............ H04N/9/00 |
| WO | WO 98/05157 A2 | 2/1998 | |
| WO | WO 98/05176 | 2/1998 | ............ H04Q/7/22 |
| WO | WO99/17581 | 4/1999 | ............ H04Q/7/34 |

OTHER PUBLICATIONS

Copy of Search Report for PCT/US 00/09476.
Copy of Annex to Form PCT/ISA/206, The Partial International Search for PCT/US 00/09476.
TR45 TIA/EIA–136–123–A Draft Text: Digital Control Channel Layer 3; Ch. 1.1.1 and 1.1.2, 5 pages (Aug. 1998).

*Primary Examiner*—Charles N. Appiah
(74) *Attorney, Agent, or Firm*—Myers Bigel Sigley & Sajovec (57) ABSTRACT

Group calls can be provided between an originating terminal and a called terminal on a radiotelephone communications system including a switching center and a plurality of radio base stations wherein each of the radio base stations defines a cell and wherein each of the originating and called terminals is in one of the cells. In particular, a group call origination message can be received from the originating terminal, and after receiving the group call origination message, a group call setup message can be sent to a radio base station defining a cell within which the called terminal is located. After sending the group call setup message, first and second traffic channels can be designated for the originating terminal to provide communications between the originating and called terminals. Related systems are also discussed.

45 Claims, 8 Drawing Sheets

U.S. PATENT DOCUMENTS

| | | |
|---|---|---|
| 5,987,331 A | 11/1999 | Grube et al. |
| 5,991,635 A | 11/1999 | Dent et al. |
| 6,026,296 A | 2/2000 | Sanders, III et al. |
| 6,097,951 A * | 8/2000 | Ernam et al. ............... 455/432 |
| 6,111,867 A | 8/2000 | Mann et al. ................ 370/337 |
| 6,115,613 A * | 9/2000 | Jonsson ..................... 455/414 |
| 6,138,011 A * | 10/2000 | Sanders et al. ............. 455/426 |
| 6,195,415 B1 | 2/2001 | Shimoda et al. |
| 6,272,334 B1 | 8/2001 | Rao |
| 6,292,670 B1 * | 9/2001 | Kauria et al. ............... 455/509 |
| 6,377,560 B1 | 4/2002 | Dailey ....................... 370/329 |

* cited by examiner

METHODS AND SYSTEMS FOR PROVIDING GROUP CALLS WITH REDUCED SETUP TIMES

RELATED APPLICATIONS

This application is related to: application Ser. No. 09/309,018 entitled Methods and Systems for Providing Temporary Identification Numbers For Mobile Terminals; application Ser. No. 09/309,012 entitled Apparatus And Methods For Conducting Group Calls In Wireless Communications Systems; application Ser. No. 09/307,996 entitled Methods, Systems, And Terminals For Assigning. Control Channel Time Slots For Group And Individual Pages; and application Ser. No. 09/309,022 entitled Methods, Systems, And Terminals For Providing Group Communications Over A Common Traffic Channel. Each of these applications are being filed concurrently with the present application, each of these applications have common inventorship, and each of these applications are assigned to Ericsson, Inc. In addition, the disclosures of each of these applications are hereby incorporated herein by reference.

FIELD OF THE INVENTION

The present invention relates to the field of communications and more particularly to radiotelephone communications methods and systems.

BACKGROUND OF THE INVENTION

Figure 1:
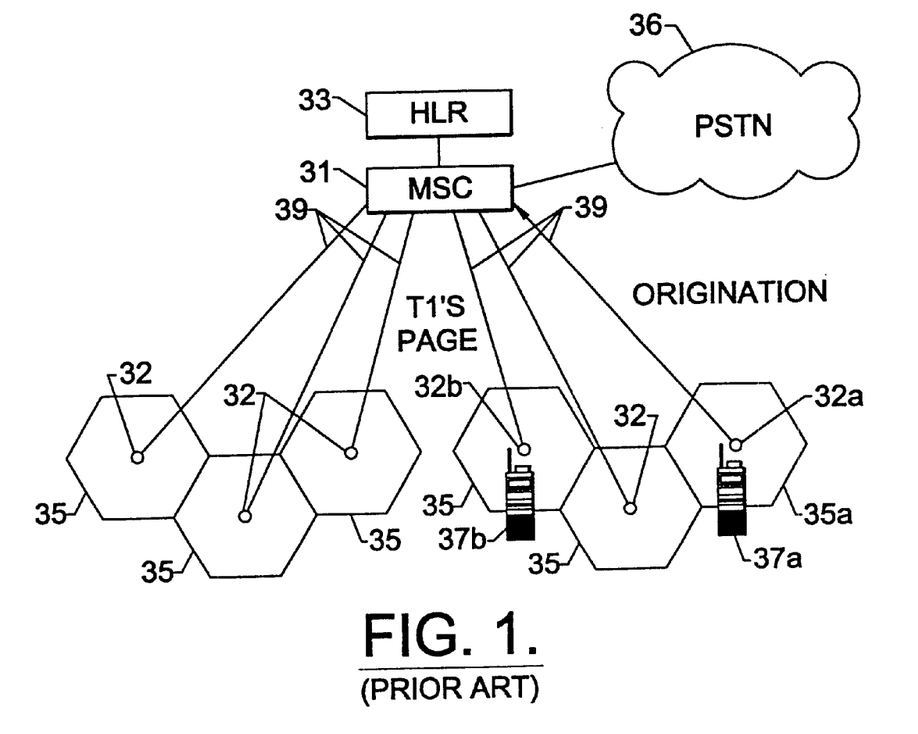
FIG. 1 is a block diagram of a cellular radiotelephone communications system according to the prior art.

Conventional cellular communications systems (such as systems operating according to the IS-136 standard) generally provide one-to-one communications from one mobile terminal to another mobile terminal or to a landline telephone coupled to a public switched telephone network. A conventional cellular communications system is illustrated in FIG. 1. This system includes a mobile switching center (MSC) 31 and a home location register 33.

The MSC is coupled to a plurality of radio base stations (RBS) 32 wherein each RBS 32 defines a cell 35. In addition, the MSC can be coupled to a public switched telephone network (PSTN) 36. As will be understood by those having skill in the art, the conventional cellular communications system of FIG. 1 can provide cellular radiotelephone communications for one or more cellular mobile terminals (MT) 37. More particularly, the cellular radiotelephone communications can be provided using conventional cellular standards wherein a telephone is dialed to place a call to another communications device.

Each RBS provides radio frequency transmit and receive functions and supports low level protocol functions. Moreover, a RBS can be considered a dumb peripheral of the MSC 31 wherein the MSC provides central intelligence for the system. Each RBS can be coupled to the MSC 31 via communications links 39. These communications links can be T1 links provided, for example, via landline or microwave. The MSC 31 provides voice path switching between two cells or a cell and the PSTN 36. The MSC 31 provides central system intelligence to control the radio base stations and to process high level protocol messages from mobile terminals 37 relayed by the radio base stations. In other words, the MSC handles call setup, paging, handoff, and call connection.

The home location register 33 keeps track of the current status of the mobile terminals. For each mobile terminal, for example, the home location register can record whether that terminal is on, off, or busy, as well as the location area (including a group of cells) within which the mobile terminal is located. The home location register can also include a database of restrictions and allowed service features for each mobile terminal. The home location register can also be considered a portion of the MSC.

Figure 2:
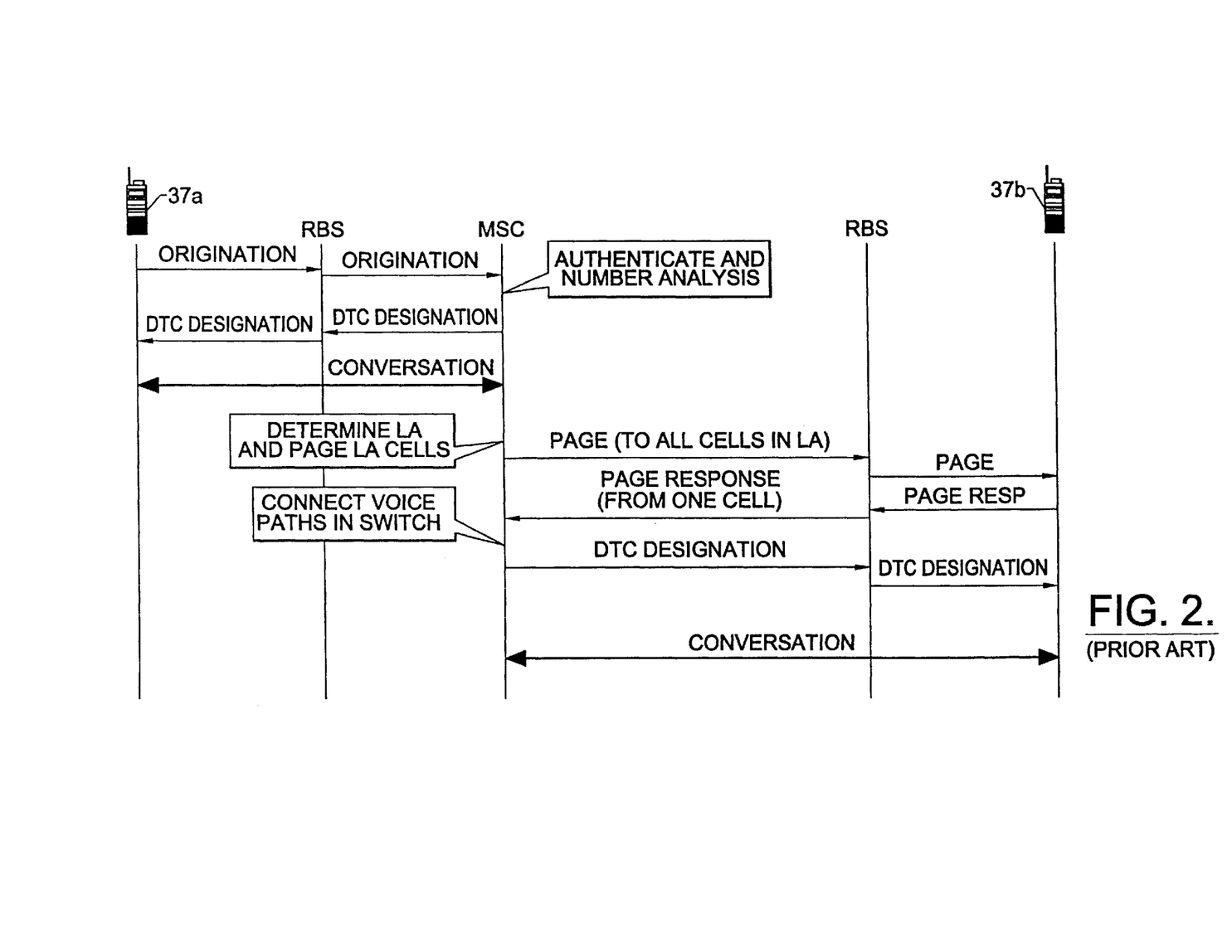
FIG. 2 is a message flow diagram illustrating steps of setting up a one-to-one radiotelephone call in the system of FIG. 1.

The setup of a call between mobile terminals 37 using the system of FIG. 1 is illustrated in FIG. 2. As shown, the originating mobile terminal 37a issues an origination message which is received by the radio base station 32a for the cell 35a in which the mobile terminal 37a is located. The radio base station 32a checks the origination message for errors, and if no significant errors are detected, the radio base station 32a forwards the message to the mobile switching center. The mobile switching center authenticates the originating mobile terminal 37a and analyses the called number. If the originating mobile terminal and the called number are valid, the mobile switching center instructs the radio base station 32a to assign a Digital Traffic Channel (DTC) to the originating mobile terminal. Origination and channel designation messages are discussed, for example, in TR45, TIA/EIA-136-123-A Draft Text, Digital Control Channel Layer 3, Aug. 31, 1998, the disclosure of which is hereby incorporated herein in its entirety by reference.

Because the called party is another mobile terminal, the mobile switching center checks the HLR to determine the current location area (LA) for the called mobile terminal 37b if the called mobile terminal is active. A plurality of cells is assigned to a location area, and a mobile terminal updates its location with the cellular system only when the mobile terminal enters a new location area. Accordingly, location area updates are not needed every time a mobile terminal enters a new cell. While Digital Control Channel (DCCH) traffic maybe reduced, pages for a called mobile terminal may need to be transmitted in all cells assigned to the location area.

The mobile switching center then issues a page message to all radio base stations supporting cells in the location area of the called mobile terminal 37b. Each of these radio base stations issues a page message on an appropriate paging subchannel. Because of the DCCH paging structure, however, a period of time as long as 1.28 seconds may pass before the page message can be issued. The page message wakes the called mobile terminal from its battery sleep mode, and the called mobile terminal 37b responds to the appropriate radio base station (now referred to as the called radio base station 32b) with a page response message to indicate the same.

The page response message is relayed from the called radio base station 32b to the mobile switching center, and the mobile switching center instructs the called radio base station 32b to assign a digital traffic channel to the called mobile terminal 37b. The mobile switching center then completes a communications path between the originating mobile terminal 37a and the called mobile terminal 37b using the two digital traffic channels.

The conventional cellular communications system of FIG. 1, however, may not support dispatch oriented group calls (also referred to as conference calls). Radio dispatch group communications systems are commonly used by emergency service providers such as police and/or fire departments to provide communications between a dispatcher and emergency personnel. For example, a police dispatcher can simultaneously call all on-duty police officers using a radio dispatch communications system. Alternately, a police office can quickly establish communications with other police officers and/or dispatchers simply by pressing a push-to-talk button on his radio. Similar radio dispatch communications systems may also be used by businesses such as trucking and/or taxi businesses.

In general, radio dispatch group communications systems provide oneto-many group communications as opposed to one-to-one communications provided by conventional cellular radiotelephone communications systems. Radio dispatch group communications are also preferably provided without the call setup delays that may be common in a conventional cellular radiotelephone communications system. For example, the time required to setup a call in a conventional IS-136 cellular radiotelephone system may be as long as 6 or 7 seconds including up to 1.28 seconds just to page the receiving cellular radiotelephone. This setup time, however, may be unacceptable for police and other radio dispatch group communications systems.

With the proliferation of cellular communications systems, there has been an effort to provide hybrid communications systems that can support both cellular radiotelephone communications as well as dispatch oriented group communications. Such a system has been developed, for example, by Motorola with service being offered by Nextel. A similar system has been developed by Ericsson (the assignee of the present application) under the name DAMPS-PRO. In particular, the DAMPS-PRO product provides cellular communications according to the IS-136 cellular communications standard, as well as dispatch oriented group communications for predefined user groups.

Figure 3:
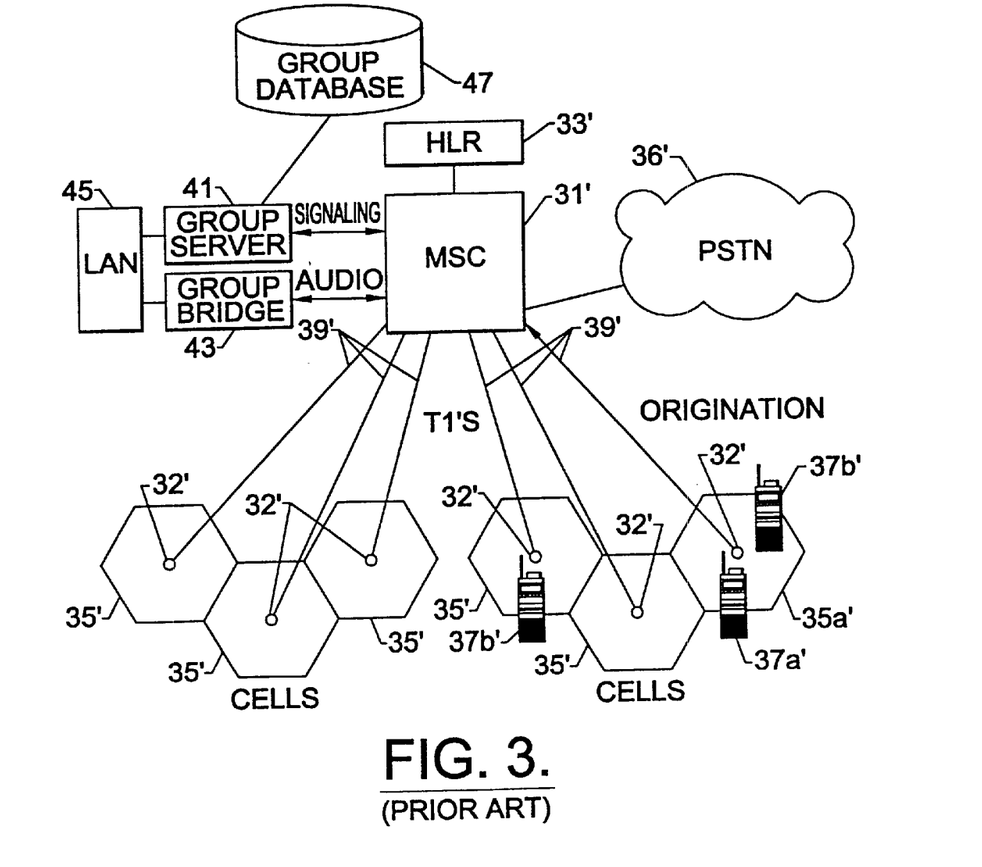
FIG. 3 is a block diagram of a cellular radiotelephone communications system with the addition of group calling functionality according to the prior art.

In the DAMPS-PRO system, intelligent group communications functionality is added to an IS-136 cellular communications system as shown in FIG. 3. This intelligent group communications functionality is provided by adding a group server 41, a group bridge 43, a local area network 45, and a group database 47. The cells, mobile switching center, home location register, public switched telephone network, and radio base stations provide cellular communications as discussed above with regard to FIGS. 1 and 2.

With regard to group calls, the group bridge provides a bank of telephony equipment which can initiate and receive radiotelephone calls, provide voice prompts, and respond to user inputs. The bridge also provides a group function that sums the audio from all parties within a designated group and distributes the summed audio to all parties. The server communicates with the mobile switching center via standard telephony signaling (such as defined by the SS7 standard) and controls the operation of the bridge equipment via the local area network.

Figure 4:
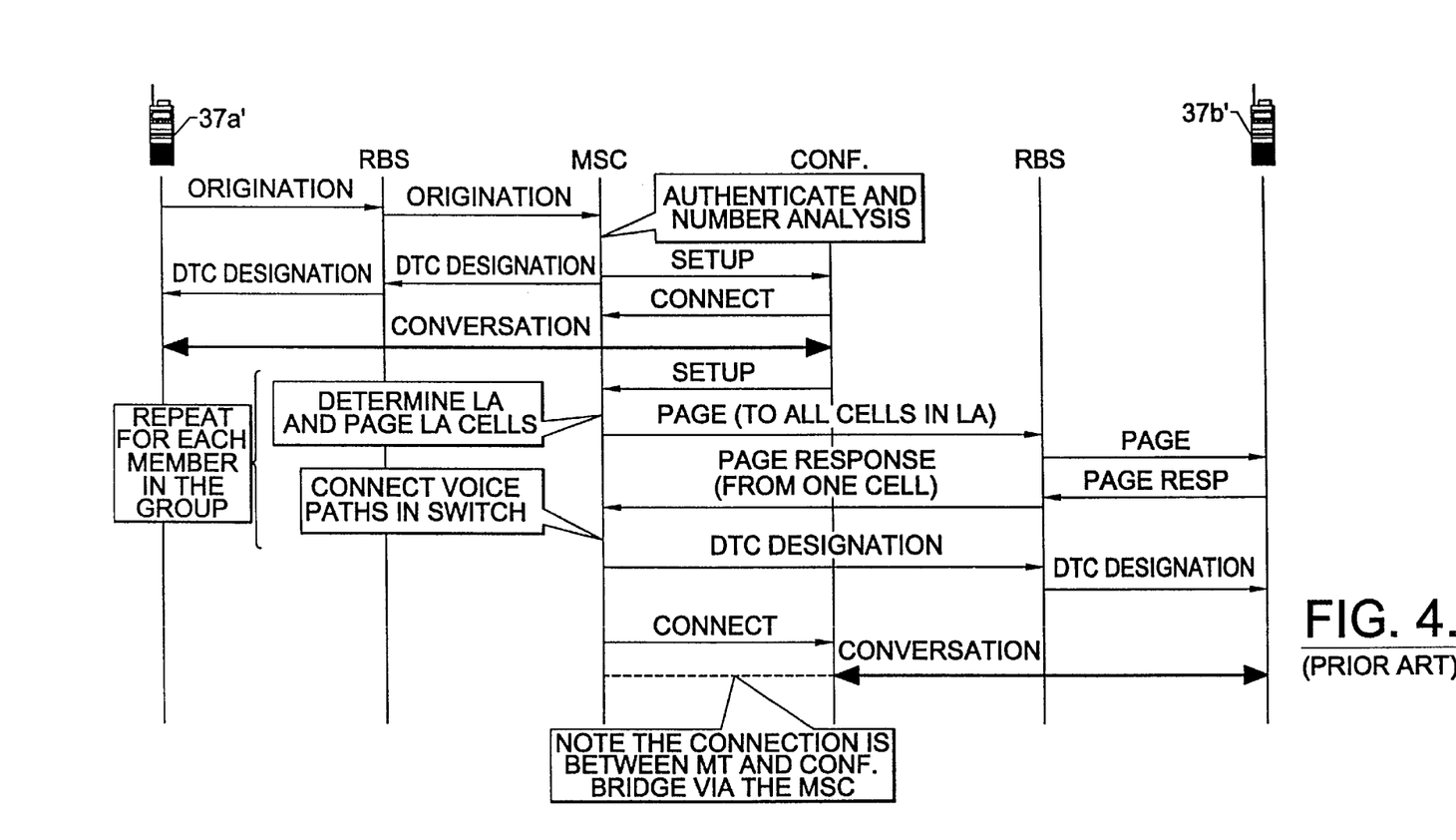
FIG. 4 is a message flow diagram illustrating steps of setting up a group radiotelephone call in the system of FIG. 3.

The setup for a group call according to the DAMPS-PRO system is illustrated in FIG. 4. In general, a predetermined set of mobile terminals define a group which can communicate in the group call mode. Each of these mobile terminals may have standard cellular radiotelephone functionality whereby one-to-one communications can be provided after entering a telephone number and pressing a send button. Mobile terminals in a conference group may also include a push-to-talk (PTT) button which can automatically establish a group call with other active mobile terminals in the group.

In particular, an originating mobile terminal 37a' may issue an origination message when the PTT button is pushed. The radio base station providing service to the originating mobile terminal 37a' (now referred to as the originating radio base station 32a') receives the origination message, and checks the origination message for errors. If no significant errors are detected, the origination message is forwarded to the mobile switching center. The mobile switching center authenticates the originating mobile terminal 37a' and analyses the called number therein identifying the group. If the originating mobile terminal 37a' and the identified group are valid, the mobile switching center authorizes the originating radio base station 32a' to assign a digital traffic channel to the originating mobile terminal 37a', and a conversation channel is established between the originating mobile terminal 37a' and the group bridge 43 using the assigned digital traffic channel.

Figure 5:
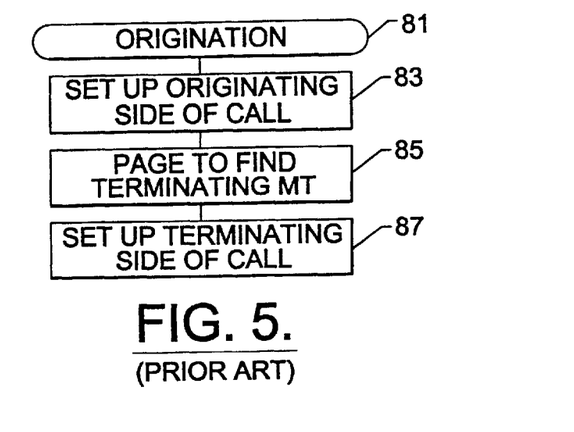
FIG. 5 is a flow diagram illustrating steps of setting up a group call according to the prior art.

Group calls are indicated by a Called party number portion of the origination message that is understood by both the mobile terminals in the group and the mobile switching center. The mobile switching center detects that the called party number is for a group call and connects the originating mobile terminal to the conference bridge. The conference server accepts the call and then searches the group database to determine the other mobile terminals in the group that should be called. The server then instructs the conference bridge to place calls to each of the other mobile terminals in the group via the mobile switching center. The call from the originating mobile terminal and the calls to each of the other mobile terminals in the group are then grouped together. In particular, the mobile switching center issues pages for each of the other mobile terminals in the group and completes each call normally once each serving radio base station is known. As further shown in the flow diagram of FIG. 5, the steps of sending the origination message at block 81, setting up the originating side of the call at block 83, paging to locate the called mobile terminals at block 85, and setting up the terminating side of the call at block 87 proceed sequentially.

The group approach currently provided as discussed above allows group calls on a cellular radiotelephone system using existing standards and cellular mobile terminals, but the call setup time may be slower than desired. Accordingly, there continues to exist a need in the art for improved group calling features on conventional cellular systems.

SUMMARY OF THE INVENTION

It is therefore an object of the present invention to provide improved methods and systems for group communications.

It is another object of the present invention to provide cellular communications methods and systems that can provide high speed access for group communications.

These and other objects can be provided according to the present invention by a radiotelephone communications system including a switching center and a plurality of radio base stations wherein each of the radio base stations defines a cell and wherein each of an originating terminal and a called terminal is in a respective cell. In particular, a group call origination message is received from the originating terminal, and after receiving the group call origination message, a group call setup message is sent to a radio base station defining a cell within which the called terminal is located. After sending the group call setup message, first and second traffic channels are designated for the originating and called terminals, and communications between the originating and called terminals are provided. The traffic channels for the terminals in the group call can thus be set up at the same time thereby reducing the overall setup time for the group call.

Moreover, the called terminal can be one of a plurality of called terminals and each of the plurality of called terminals can be in one of the cells of the communications system. Accordingly, the step of sending the group call setup message can include sending the group call setup message to radio base stations defining cells within which each of the called terminals is located, the step of designating a second digital traffic channel can include designating a plurality of second digital traffic channels for each of the called terminals, and the step of providing communications can include providing communications between the originating terminal and each of the plurality of called terminals. In other words, the group call can include three or more terminals.

In addition, the step of receiving the group call origination message can be preceded by receiving a log-in message from the called terminal through the radio base station defining the cell within which the called terminal is located. A database can then be updated for the called terminal identifying the radio base station defining the cell within which the called terminal is located, and the step of sending the group call setup message can include sending the group call setup message for the called terminal only to the radio base station defining the cell within which the called terminal is located as defined in the database. Preferably, the log-in message is received from the called terminal every time the called terminal is active and is moved to a new cell.

Because the communications system can determine which radio base station is providing service to the called terminal, the system can begin establishing the group communications links between the switching center and the called radio base station before the called terminal responds to any pages thereby reducing setup times. In other words, the communications system does not need to transmit pages for the called terminal from a plurality radio base stations and wait for a response to establish communications links between the switching center and the called radio base station.

The step of designating a second digital traffic channel can also be preceded by generating at the radio base station defining the cell within which the called terminal is located a second group call origination message after sending the group call setup message, and sending the second group call origination message to the switching center. This second group call origination message is used to establish communications links for the group call between the called radio base station and the switching center, and these links can be set up without waiting for the called terminal to respond. By using a second group call origination message, the called radio base station can be treated as if it is placing a call to a group server in the switching center further reducing the group call setup time while using conventional cellular protocols supported by the communications system.

The communications system of the present invention can thus provide conventional one-to-one cellular calls as well as group calls. More particularly, the group call features of the present invention can be used to provide group dispatch communications such as for police and/or fire departments, and each of the originating and called terminals can be a mobile or a fixed terminal such as a fixed dispatch terminal at a dispatch center. In addition, the switching center can be a mobile switching center, and the mobile switching center can be defined to include a group server, a group bridge, a router, and a local area network coupled between the group server, the group bridge, and the router.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A hybrid cellular radiotelephone communications system providing group communications according to the present invention will now be described with reference to FIGS. 6–8. In particular, the system of FIG. 6 includes a mobile switching center 131, a plurality of radio base stations defining a respective plurality of cells 132, and a home location register 133. Moreover, the mobile switching center 131 can be coupled to a public switched telephone network 136. The system of FIG. 6 can thus provide conventional one-to-one cellular radiotelephone communications according to a cellular communications standard such as the IS-136 standard.

In addition, group call functionality is provided using the group server 141, the group bridge 143, the router 153, the group database 147, the tracking database 149, and the mobile terminal parameter database 151. As shown, the mobile switching center 131 is coupled to the radio base stations 132 through communications links illustrated as solid lines. The communications links between the mobile switching center and the radio base stations (illustrated in solid lines) can be T1 links provided, for example, via landline or microwave.

Communication links are also provided between the router 153 and the radio base stations 132 as indicated by the dotted lines. In particular, the communications links between the router 153 and the radio base stations 132 can also be provided by T1 lines. As shown, the communications links between the router and the radio base stations can be provided through the mobile switching center using T1 lines, without processing these communications at the mobile switching center. This arrangement has the advantage that existing communications links (such as T1 lines) can be used thereby reducing the need for additional hardware. Alternately, communications links can be provided between the router and the radio base stations without physically passing through the mobile switching center. The communications links between the router and the radio base stations can be provided according to an existing standard such as the TCP/IP standard.

The tracking database 149 and the mobile terminal parameters database 151 are used to keep track of mobile terminal locations and parameters. In particular, each mobile terminal preferably generates a login message (transmitted over a digital control channel) whenever the mobile terminal enters a new cell and is thus serviced by a new base station or whenever the mobile terminal is turned on. The login message is received by the new servicing radio base station which then transmits the login message to the group server. The group server can thus determine which radio base station is currently serving each mobile terminal, and this information can thus be stored in the tracking database. The tracking database can thus be used to identify for each active mobile terminal the particular radio base station providing service to that mobile terminal.

Figure 7:
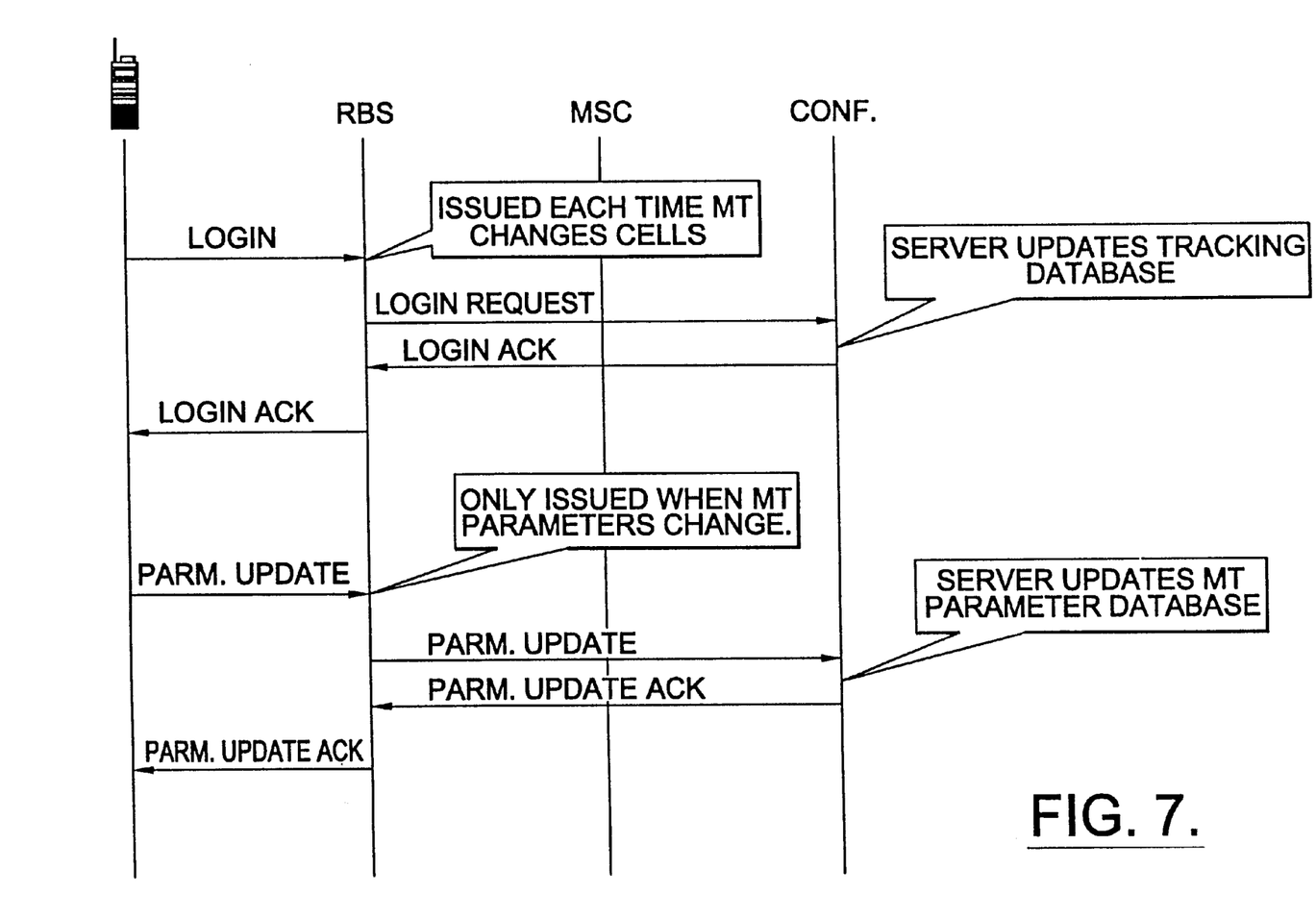
FIG. 7 is a message flow diagram illustrating steps of cell login-in according to the system of FIG. 5.

As also shown in FIG. 7, a parameter update message can be generated by the mobile terminal when the mobile terminal first enters the communications system or when parameters for the mobile terminal change. In particular, the parameter update message can include parameter information for the mobile terminal that may be different for other mobile terminals operating in the same system. For example, the parameter information can include the particular vocoder used by the terminal, and/or security information such as whether the mobile terminal supports encription and if so the type of encription. The parameter update message is received by the radio base station and the corresponding parameter information for the mobile terminal is stored in the mobile terminal database of the conference equipment. This information can then be used when issuing a called origination message as discussed below.

The login message can be a relatively short message transmitted within a single time slot of a single time division multiple access (TDMA) time frame so that traffic on the digital control channels is not significantly increased. The mobile terminal parameter database can be used to store mobile terminal parameters for each mobile terminal, and the mobile terminal parameters can be updated responsive to parameter update messages transmitted by the mobile terminals as discussed in greater detail below. The generation of login messages and parameter update messages is illustrated in FIG. 7.

Figure 6:
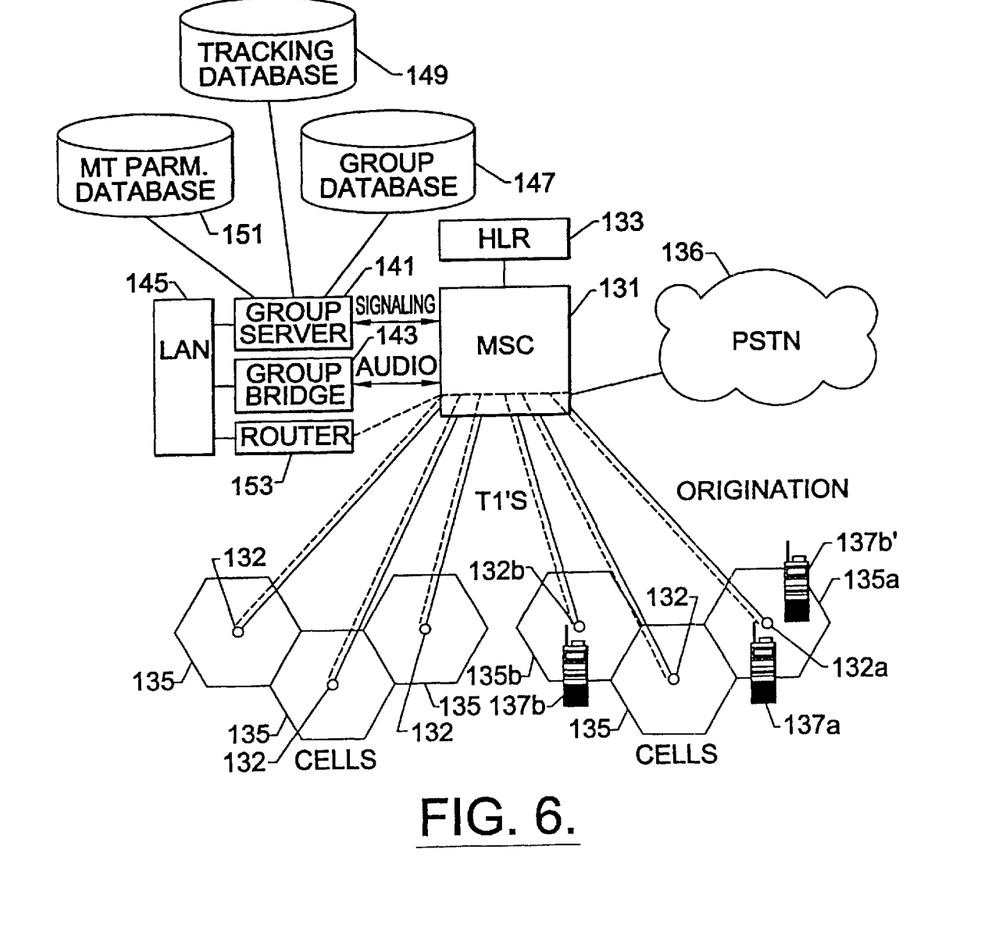
FIG. 6 is a block diagram of a cellular radiotelephone communications system including group calling functionality according to the present invention.
Figure 8:
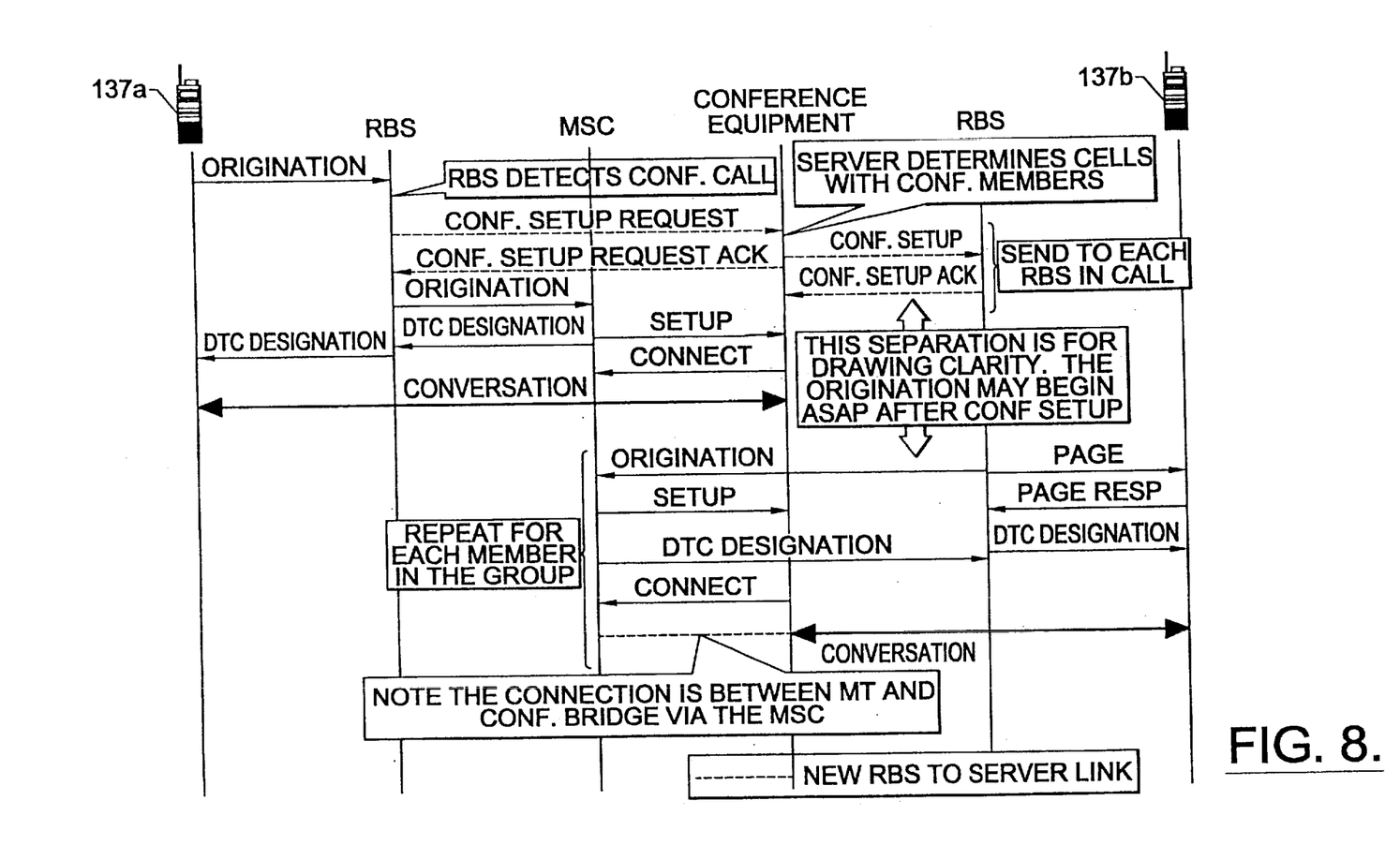
FIG. 8 is a message flow diagram illustrating steps of setting up a group radiotelephone call in the system of FIG. 5.

The setup of a group call using the system of FIG. 6 according to the present invention is illustrated in FIG. 8. In FIG. 8, the Conference Equipment includes the group server 141, group bridge 143, router 153, local area network 145, mobile terminal parameter database 151, tracking database 149, and group database 147. In particular, the originating mobile terminal 137a transmits a calling origination message that is received by the radio base station providing service to the originating mobile terminal (now referred to as the originating radio base station 132a). The information transmitted in the calling origination message can be reduced as compared to that of a conventional cellular origination message, because the parameter information for the mobile terminal is stored in mobile terminal parameter database as discussed above. By reducing the information transmitted in the calling origination message, the calling origination message can be transmitted over a single time slot thereby reducing call setup time.

The originating radio base station is able to identify a calling origination message for a group call, and thus transmits a group setup request to the group server 141. The calling origination message and the group setup request include portions thereof identifying the originating mobile terminal 137a (MIN) and the group of mobile terminals (identified by a group number) to be included in the group call. In addition, the mobile identification numbers (MINs) for each mobile terminal in the group are stored in the group database 147. The group server is thus able to identify all mobile terminals to be included in the group call (now referred to as the called mobile terminals 137b).

The server verifies that the requested group is a valid group and that the originating mobile terminal 137a is allowed to initiate calls to the requested group. After successful verification, the server 141 references the group database 147 to determine the other mobile terminals in the called group (now referred to as the called mobile terminals 137b) and their mobile identification numbers (MINs). The server also checks the tracking database to determine the radio base stations currently serving the called mobile terminals (now referred to as the called radio base stations 132b).

As shown in FIG. 6, the called mobile terminal 137b is located in the called cell 135b serviced by the called radio base station 132b. The called mobile terminal 137b', however, is in the cell 135a, serviced by the radio base station 132a. Accordingly, the radio base station 132a is both the originating radio base station and one of the called radio base stations. The radio base station 132a can thus provide all the functions discussed with reference to the originating radio base station 132a as well as the functions discussed with reference to the called radio base stations 132b. Furthermore, more than three mobile terminals can be included in the calling group, and one or more of the mobile terminals of the group can be in any of the cells of the system.

The server then issues a group setup message to the called radio base stations 132b (and 132a in this example) as well as a conference acknowledge to the originating radio base station 132a. The server 141 also notifies the group bridge 143 which call-in numbers will be used for the group call so that the bridge 143 can group the calls together. A group setup message is thus sent to respective called radio base stations providing service for each active called mobile terminal in the called group. Moreover, each group setup message can include the following information: (1) the mobile identification number for the called mobile terminal; (2) the call-in number to be called by the called radio base station providing service for the called mobile terminal; (3) the group number called by the originating mobile terminal; and (4) the mobile terminal parameter data for the called mobile terminal.

Each of the called radio base stations then issues a called origination message to the mobile switching center 131 responsive to the group setup message. Each called origination message includes the mobile identification number (MIN) for the respective called mobile terminal so that the mobile switching center believes the respective called mobile terminal issued the called origination message. The called origination message also includes the call-in number in the called party field, as well as the parameter information previously stored in the mobile terminal parameter database. This allows the call setups for both the originating mobile terminals and the called mobile terminals to proceed in parallel. This procedure also allows the mobile switching center to use its standard authentication and billing functions. In other words, each mobile terminal in the called group is treated as if it originated a call, and each mobile terminal in the called group can be billed for its own air time. In other words, by using the information for the called mobile terminal stored in the tracking database and the mobile terminal parameter database, the called radio base station is able to issue the called origination message without waiting for the called mobile terminal to respond to a page thus reducing call setup time.

After issuing a called origination message, each called radio base station transmits a page during the next available paging subchannel to the respective called mobile terminal using the mobile identification number specified in the respective group setup message. This page wakes the mobile terminal to participate in the group call. The page message includes the group number in the calling party number field thus allowing the called mobile terminal to determine that the call is a group call so that the called mobile terminal can behave as if it originated a call once a digital traffic channel is assigned. Accordingly, the paging can proceed simultaneously with other call setup activities such as the designation of a digital traffic channel by the mobile switching center.

Because the radio base station servicing each called mobile terminal is known as a result of the login message information stored in the tracking database, group setup messages can be transmitted only to radio base stations currently providing service to active mobile terminals in the group. Accordingly, the called radio base stations can transmit the respective called origination messages before receiving a page response from the respective called mobile terminal (or even before sending the page to the called mobile terminal). In other words, a called radio base station can begin setting up communications between it and the group bridge before the respective called mobile terminal has responded because it is already known that the called mobile terminal is being serviced by that base station, and because the group setup message for a called mobile terminals is only sent to the radio base station providing service therefor. The time required for group call setup can thus be reduced.

In addition, the originating radio base station receives a group setup request acknowledge to confirm that the group setup request was received by the group server. The group setup request acknowledge can include the mobile identification number for the originating mobile terminal, the call-in number (optional for the originating radio base station), the group number called by the originating mobile terminal, and mobile terminal parameter data (optional). The originating mobile terminal modifies the calling origination message received from the originating mobile terminal to include mobile terminal parameters received and replaces the called party number with the group call-in number if provided. The designation of a digital traffic channel and opening of a conversation path for the originating mobile terminal can thus be done in parallel with the designation of digital traffic channels and the opening of conversation paths for the called mobile terminals so that the time required for group call setup can be reduced. Furthermore, the group call functionality according to the present invention can be provided using cellular systems operating according to existing cellular standards such as IS-136.

Figure 9:
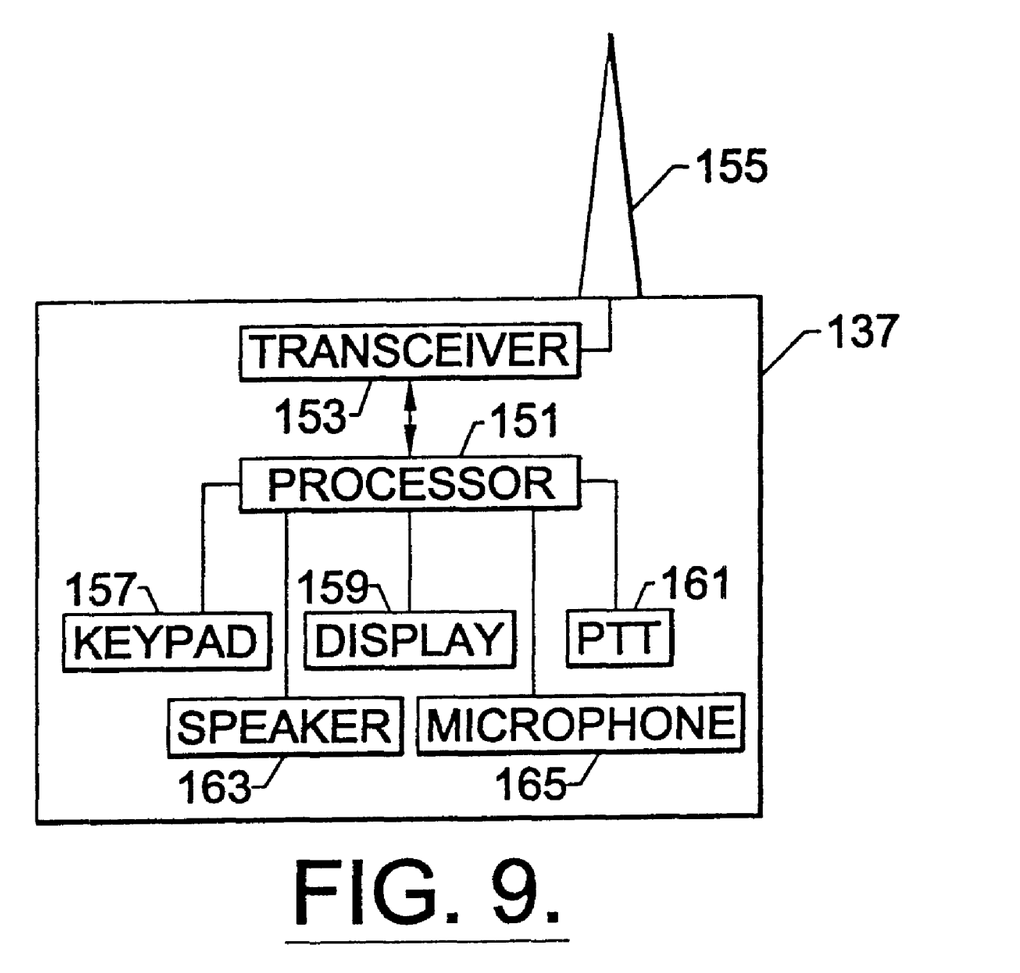
FIG. 9 is a block diagram of a mobile terminal for use with the cellular radiotelephone communications system of FIG. 6.

FIG. 9 is a block diagram of a mobile terminal 137 for use in the communications system of FIG. 6 providing both one-to-one cellular radiotelephone calls and group calls. As shown, the mobile terminal 137 includes a processor 151, a transceiver 153, an antenna 155, a keypad 157, a display 159, a push-to-talk (PTT) button 161, a speaker 163, and a microphone 165. The mobile terminal 137 can initiate and receive one-to-one cellular radiotelephone calls according to a conventional cellular standard such as the IS-136 standard.

In particular, the mobile terminal can initiate a one-to-one call responsive to the entry of a telephone number through the keypad followed by pushing a send key on the keypad. The mobile terminal can receive a one-to-one call from other terminals upon receipt of a page from the communications system causing the phone to ring wherein the user can accept the call by pressing the send key on the keypad.

The processor of the mobile terminal 137 can also be programmed to provide the group calling features discussed above with regard to the communications system of FIGS. 6, 7, and 8. In particular, the mobile terminal processor 151 can be programmed as one of a group of mobile terminals that can be included in group calls. For example, the mobile terminal processor (and the processors of other mobile terminals in the group) can be programmed with a group number identifying the group, and a group call can be initiated responsive to pressing the PTT button. When the PTT button is pushed, the mobile terminal transmits a calling origination message including the group number as discussed above thereby initiating a group call between the active mobile terminals in the group. The mobile terminal can also receive group calls as discussed above with reference to FIGS. 6–8. Moreover, the mobile terminal can transmit login messages and parameter messages as discussed above with regard to FIG. 7.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method for providing group calls between an originating terminal and a called terminal on a radiotelephone communications system including a switching center and a plurality of radio base stations wherein each of the radio base stations defines a cell and wherein each of the originating and called terminals is in one of the cells, the method comprising the steps of:

receiving a group call origination message from the originating terminal;

after receiving the group call origination message, sending a group call setup message to a radio base station defining a cell within which the called terminal is located;

after sending the group call setup message, designating a first traffic channel for the originating terminal;

after sending the group call setup message, designating a second traffic channel for the called terminal; and after designating the first and second digital traffic channels, providing communications between the originating and called terminals;

wherein the step of designating a second digital traffic channel is preceded by the steps of:

after sending the group call setup message, generating at the radio base station defining the cell within which the called terminal is located a second group call origination message; and sending the second group call origination message to the switching center.

2. A method according to claim 1 wherein the called terminal is one of a plurality of called terminals and each of the plurality of called terminals is in one of the cells:

wherein the step of sending the group call setup message comprises sending the group call setup message to radio base stations defining cells within which each of the called terminals is located;

wherein the step of designating a second traffic channel comprises designating a plurality of second traffic channels for each of the called terminals; and wherein the step of providing communications comprises providing communications between the originating terminal and each of the plurality of called terminals.

3. A method according to claim 1 wherein the step of receiving the group call origination message is preceded by the steps of:

receiving a log-in message from the called terminal through the radio base station defining the cell within which the called terminal is located; and updating a database, responsive to the log-in-message, for the called terminal identifying the radio base station defining the cell within which the called terminal is located, wherein the step of sending the group call setup message comprises sending the group call setup message for the called terminal only to the radio base station defining the cell within which the called terminal is located as defined in the database.

4. A method according to claim 3 wherein the step of receiving the log-in message comprises receiving the log-in message from the called terminal every time the called terminal is active and is moved to a new cell.

5. A method according to claim 3 wherein the step of receiving the log-in message comprises receiving the log-in message from the called mobile terminal every time the called mobile terminal is turned on in one of the cells.

6. A method according to claim 1 wherein the step of generating the second group call origination message is preceded by the steps of:

receiving a parameter update message from the called mobile terminal; and updating a database for the called terminal, responsive to the parameter update message, to include operating parameters for the called terminal, wherein the second group call origination message comprises the operating parameters for the called terminal included in the database.

7. A method according to claim 1 wherein at least one of the originating and called terminals comprises a fixed terminal.

8. A method according to claim 1 wherein the switching center comprises a mobile switching center.

9. A method according to claim 8 wherein the mobile switching center includes a group server, a group bridge, a router, and a local area network coupled between the group server, the group bridge, and the router.

10. A method according to claim 1 wherein the originating and called terminals are in a common cell.

11. A method for providing group calls between an originating terminal and a called terminal on a radiotelephone communications system including a switching center and a plurality of radio base stations wherein each of the radio base stations defines a cell and wherein each of the originating and called terminals is in one of the cells, the method comprising the steps of:

receiving a first group call origination message from the originating terminal;

responsive to the first group call origination message, sending a group call setup message to a radio base station defining a cell within which the called terminal is located;

responsive to the group call setup message, generating at the radio base station defining the cell within which the called terminal is located a second group call origination message;

designating a first traffic channel for the originating terminal;

responsive to the second group call origination message, designating a second traffic channel for the called terminal; and providing communications between the originating and called terminals.

12. A method according to claim 11 wherein the step of designating the first traffic channel is performed after the step of sending the group call setup message.

13. A method according to claim 11 wherein the called terminal is one of a plurality of called terminals and each of the plurality of called terminals is in one of the cells:

wherein the step of sending the group call setup message comprises sending the group call setup message to radio base stations defining cells within which each of the called terminals is located;

wherein the step of designating a second traffic channel comprises designating a plurality of second digital traffic channels for each of the called terminals; and wherein the step of providing communications comprises providing communications between the originating terminal and each of the plurality of called terminals.

14. A method according to claim 11 wherein the step of receiving the group call origination message is preceded by the steps of:

receiving a log-in message from the called terminal through the radio base station defining the cell within which the called terminal is located; and updating a database, responsive to the log-in-message, for the called terminal identifying the radio base station defining the cell within which the called terminal is located, wherein the step of sending the group call setup message comprises sending the group call setup message for the called terminal only to the radio base station defining the cell within which the called terminal is located as defined in the database.

15. A method according to claim 14 wherein the step of receiving the log-in message comprises receiving the log-in message from the called terminal every time the called terminal is active and is moved to a new cell.

16. A method according to claim 14 wherein the step of receiving the log-in message comprises receiving the log-in message from the called mobile terminal every time the called mobile terminal is turned on in one of the cells.

17. A method according to claim 11 wherein the step of generating the second group call origination message is preceded by the steps of:

receiving a parameter update message from the called mobile terminal, and updating a database for the called terminal, responsive to the parameter update message, to include operating parameters for the called terminal, wherein the second group call origination message comprises the operating parameters for the called terminal included in the database.

18. A method according to claim 11 wherein at least one of the originating and called terminals comprises a fixed terminal.

19. A method according to claim 11 wherein the switching center comprises a mobile switching center.

20. A method according to claim 19 wherein the mobile switching center includes a group server, a group bridge, a router, and a local area network coupled between the group server, the group bridge, and the router.

21. A method according to claim 11 wherein the originating and called terminals are in a common cell.

22. A method for providing group calls between an originating terminal and a called terminal on a radiotelephone communications system including a switching center and a plurality of radio base stations wherein each-of the radio base stations defines a cell and wherein each of the originating and called terminals is in one of the cells, the method comprising the- steps of:
- receiving a log-in message from the called terminal through the radio base station defining the cell within which the called terminal is located;
- updating a database, responsive to the log-in-message, for the called terminal identifying the radio base station defining the cell within which the called terminal is located;
- receiving a group call origination message from the originating terminal;
- after receiving the group call origination message, sending a group call setup message for the called terminal only to the radio base station defining a cell within which the called terminal is located as defined in the database;
- designating a first traffic channel for the originating terminal;
- after sending the group call setup message, designating a second traffic channel for the called terminal; and
- after designating the first and second traffic channels, providing communications between the originating and called terminals;
- wherein the step of designating a second traffic channel is preceded by the steps of:
  - after sending the group call setup message, generating at the radio base station defining the cell within which the called terminal is located a second group call origination message; and
  - sending the second group call origination message to the switching center.

23. A method according to claim 22 wherein the step of designating the first traffic channel is performed after the step of sending the group call setup message.

24. A method according to claim 22 wherein the step of receiving the log-in message comprises receiving the log-in message from the called terminal every time the called terminal is active and is moved to a new cell.

25. A method according to claim 22 wherein the step of receiving the log-in message comprises receiving the log-in message from the called mobile terminal every time the called mobile terminal is turned on in one of the cells.

26. A method according to claim 22 wherein the called terminal is one of a plurality of called terminals and each of the plurality of called terminals is in one of the cells:
- wherein the step of sending the group call setup message comprises sending the group call setup message to radio base stations defining cells within which each of the called terminals is located;
- wherein the step of designating a second traffic channel comprises designating a plurality of second traffic channels for each of the called terminals; and
- wherein the step of providing communications comprises providing communications between the originating terminal and each of the plurality of called terminals.

27. A method according to claim 22 wherein the switching center comprises a mobile switching center.

28. A method according to claim 27 wherein the mobile switching center includes a group server, a group bridge, a router, and a local area network coupled between the group server, the group bridge, and the router.

29. A method for providing group calls between an originating terminal and a called terminal on a radiotelephone communications system including a switching center and a plurality of radio base stations wherein each of the radio base stations defines a cell and wherein each of the originating and called terminals is in one of the cells, the method comprising the steps of:
- receiving a log-in message from the called terminal through the radio base station defining the cell within which the called terminal is located;
- updating a database, responsive to the log-in-message, for the called terminal identifying the radio base station defining the cell within which the called terminal is located;
- receiving a group call origination message from the originating terminal;
- after receiving the group call origination message, sending a group call setup message for the called terminal only to the radio base station defining a cell within which the called terminal is located as defined in the database;
- designating a first traffic channel for the originating terminal;
- after sending the group call setup message, designating a second traffic channel for the called terminal; and
- after designating the first and second traffic channels, providing communications between the originating and called terminals;
- wherein the step of generating the second group call origination message is preceded by the steps of:
  - receiving a parameter update message from the called mobile terminal; and
  - updating a database for the called terminal, responsive to the parameter update message, to include operating parameters for the called terminal, wherein the second group call origination message comprises the operating parameters for the called terminal included in the database.

30. A method according to claim 29 wherein at least one of the originating and called terminals comprises a fixed terminal.

31. A method according to claim 29 wherein the originating and called terminals are in a common cell.

32. A communications system providing group calls between an originating terminal and a called terminal, the system comprising:
- a first radio base station defining a first cell within which the originating terminal is located wherein a group call origination message is received at the first radio base station from the originating terminal;
- a switching center coupled to the first radio base station wherein the switching center generates a group call setup message responsive to receipt of the group call origination message at the first radio base station;
- a second radio base station coupled to the switching center wherein the second radio base station defines a second cell within which the called terminal is located wherein the group call setup message is received at the second radio base station, and wherein after receiving the group call setup message at the second radio base station first and second traffic channels are designated for the originating and called terminals so that communications are provided between the originating and called terminals;
- wherein before designating the second traffic channel, the second radio base station generates a second group call origination message and sends the second group call origination message to the switching center.

33. A communications system according to claim 32 wherein the called terminal is one of at least two called terminals, the communications system further comprising:
a third radio base station coupled to the switching center wherein the third radio base station defines a third cell within which a second called terminal is located, wherein the group call setup message is received at the third radio base station, and wherein a third traffic channel is designated for the second called terminal so that communications are provided between the originating and first and second called terminals.

34. A communications system according to claim 32 wherein before receiving the group call origination message from the originating mobile station at the first radio base station, a log-in message is received from the called terminal at the second radio base station, and wherein the switching center comprises a database that is updated responsive to receipt of the log-in message to identify the radio base station defining the cell within which the called terminal is located, and wherein the group call setup message for the called terminal is only sent to the second radio base station defining the cell within which the called terminal is located as defined in the database.

35. A communications system according to claim 34 wherein the log-in message is received from the called terminal every time the called terminal is active and is moved to a new cell.

36. A communications system according to claim 32 wherein at least one of the originating and called terminals comprises a fixed terminal.

37. A communications system according to claim 32 wherein the switching center comprises a mobile switching center.

38. A communications system according to claim 37 wherein the mobile switching center includes a group server, a group bridge, a router, and a local area network coupled between the group server, the group bridge, and the router.

39. A communications system providing group calls between an originating terminal and a called terminal, the system comprising:
a first radio base station defining a first cell within which the called terminal is located wherein the first radio base station receives a log-in message from the called terminal when the called terminal enters the first cell;
a switching control center coupled to the first radio base station wherein the switching control center comprises a database that is updated for the called terminal responsive to receipt of the log-in message identifying the radio base station defining the cell within which the called terminal is located; and
a second radio base station coupled to the switching center wherein the second radio base station defines a second cell within which the originating terminal is located wherein the second radio base station receives a group call origination message from the originating terminal, wherein after receiving the group call origination message, a group call setup message for the called terminal is sent only to the first radio base station defining the first cell within which the called terminal is located as defined in the database, wherein a first and second traffic channels are designated for the originating and called terminals so that communications are provided between the originating and called terminals;
a second group call origination message is generated by the first terminal and sent to the switching center after the group call setup message is generated and before the first traffic channel is designated.

40. A communications system according to claim 39 wherein the first and second traffic channels are designated after sending the group call setup message.

41. A communications system according to claim 39 wherein the log-in message is received from the called terminal every time the called terminal is active and is moved to a new cell.

42. A communications system according to claim 39 wherein the called terminal is one of at least two called terminals, the communications system further comprising:
a third radio base station coupled to the switching center wherein the third radio base station defines a third cell within which the second called terminal is located, wherein the group call setup message is received at the third radio base station, and wherein a third traffic channel is designated for the second called terminal so that communications are provided between the originating and the first and second called terminals.

43. A communications system according to claim 39 wherein at least one of the originating and called terminals comprises a fixed terminal.

44. A communications system according to claim 39 wherein the switching center comprises a mobile switching center.

45. A communications system according to claim 44 wherein the mobile switching center includes a group server, a group bridge, a router, and a local area network coupled between the group server, the group bridge, and the router.

* * * * *